US008055890B2

(12) United States Patent
Yu et al.

(10) Patent No.: US 8,055,890 B2
(45) Date of Patent: Nov. 8, 2011

(54) DATA RECOVERY METHOD (75) Inventors: Kuo-Hao Yu, HsinChu (TW); Chi-Hsiung Cheng, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 686 days.

(21) Appl. No.: 12/136,902

(22) Filed: Jun. 11, 2008

(65) Prior Publication Data
US 2008/0313451 A1 Dec. 18, 2008

(30) Foreign Application Priority Data

Jun. 12, 2007 (TW) .............................. 96121190 A (51) Int. Cl.
- G06F 15/177 (2006.01)
- G06F 11/00 (2006.01)
- G06F 3/00 (2006.01)
- G06F 21/00 (2006.01)

(52) U.S. Cl. ............ 713/1; 713/2; 714/38; 710/8; 711/6
(58) Field of Classification Search .................. 713/2, 1; 714/38; 710/8; 711/6
See application file for complete search history.

(56) References Cited

U.S. PATENT DOCUMENTS

| | | | |
|---|---|---|---|
| 5,805,882 A * | 9/1998 | Cooper et al. ..................... 713/2 |
| 5,918,047 A * | 6/1999 | Leavitt et al. ...................... 713/2 |
| 6,212,631 B1 | 4/2001 | Springer et al. | |
| 6,292,848 B1 * | 9/2001 | Plyler et al. ....................... 710/8 |
| 6,651,188 B2 * | 11/2003 | Harding et al. .................. 714/38 |
| 6,704,840 B2 | 3/2004 | Nalawadi et al. | |
| 6,763,457 B1 * | 7/2004 | Aguilar et al. .................... 713/2 |
| 6,972,977 B1 | 12/2005 | Urabe | |
| 7,024,550 B2 * | 4/2006 | Collins et al. ..................... 713/2 |
| 7,069,431 B2 * | 6/2006 | Dayan et al. ...................... 713/2 |
| 7,139,909 B2 | 11/2006 | Lee | |
| 7,234,052 B2 * | 6/2007 | Lee et al. .......................... 713/2 |
| 2003/0233533 A1 | 12/2003 | Avraham | |
| 2004/0025145 A1 | 2/2004 | Dawson | |
| 2004/0044890 A1 * | 3/2004 | Lim et al. .......................... 713/2 |
| 2004/0103272 A1 | 5/2004 | Zimmer et al. | |
| 2005/0160217 A1 * | 7/2005 | Gonzalez et al. ................. 711/6 |
| 2006/0206701 A1 | 9/2006 | Hutton et al. | |

* cited by examiner

Primary Examiner — Thomas Lee
Assistant Examiner — Aurel Prifti
(74) Attorney, Agent, or Firm — Muncy, Geissler, Olds & Lowe, PLLC (57) ABSTRACT The present invention provides a data recovery method in a system with storage of default values and prior configuration values, including executing initialization of the system; loading the default values; detecting a status of a first flag to generate a first detection result; and, determining whether a boot-up sequence is complete according to the first detection result.

19 Claims, 8 Drawing Sheets

DATA RECOVERY METHOD

CROSS-REFERENCES TO RELATED APPLICATIONS

This non-provisional application claims priority under 35 U.S.C. §119(a) on Patent Application No(s) 96121190 filed in Taiwan, R.O.C. on Jun. 12, 2007, the entire contents of which are hereby incorporated by reference.

FIELD OF INVENTION

The present invention relates to a system data management method, particularly a data recovery method.

BACKGROUND OF THE INVENTION

Conventionally, non-volatile memory (NVM) 100, such as flash memory, of a system is provided with four blocks (hereinafter referred to as first block 110, second block 120, third block 130 and fourth block 140, respectively), which are used respectively to store a default value 110a, a current configuration value 120a, a prior configuration value 130a, and a default-recovery value for 140a.

Figure 1A:
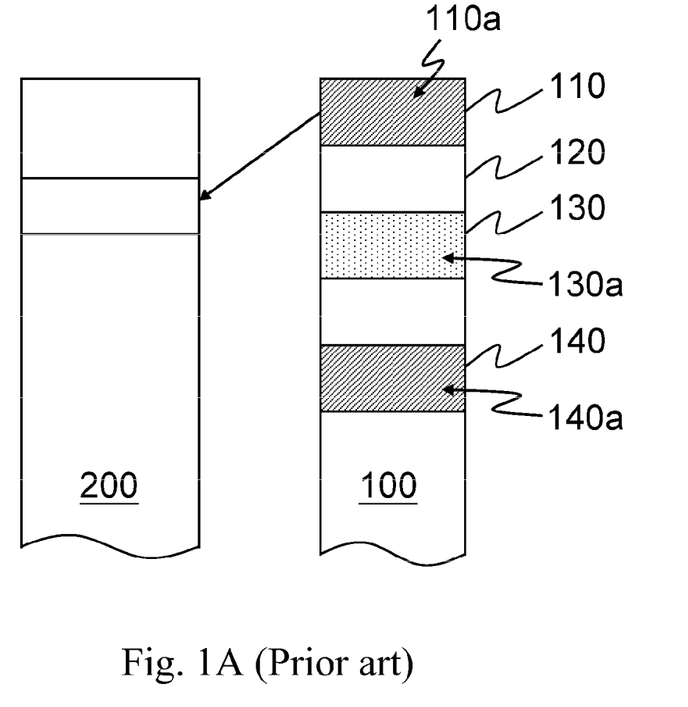
FIG. 1A~1E are the schematic views of the conventional system data management structure.

Referring to FIG. 1A, during an initialization sequence, the default value 110a in the first block 110 of the non-volatile memory 100 is loaded into volatile memory 200, such as DDR (double data rate) memory by a memory control unit.

Figure 1B:
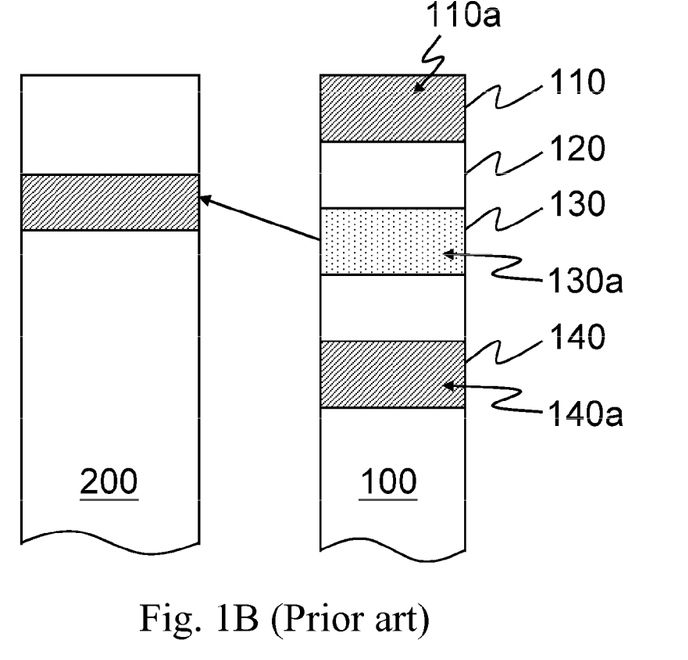

Referring to FIG. 1B, the configuration value executed during a previous shutdown and recorded in the third block 130 (hereinafter referred to as the prior configuration value 130a) is then loaded into the volatile memory 200, and the default value 110a is modified according to the prior configuration value 130a. Thereby, the system can rapidly access the volatile memory 200.

Figure 1C:
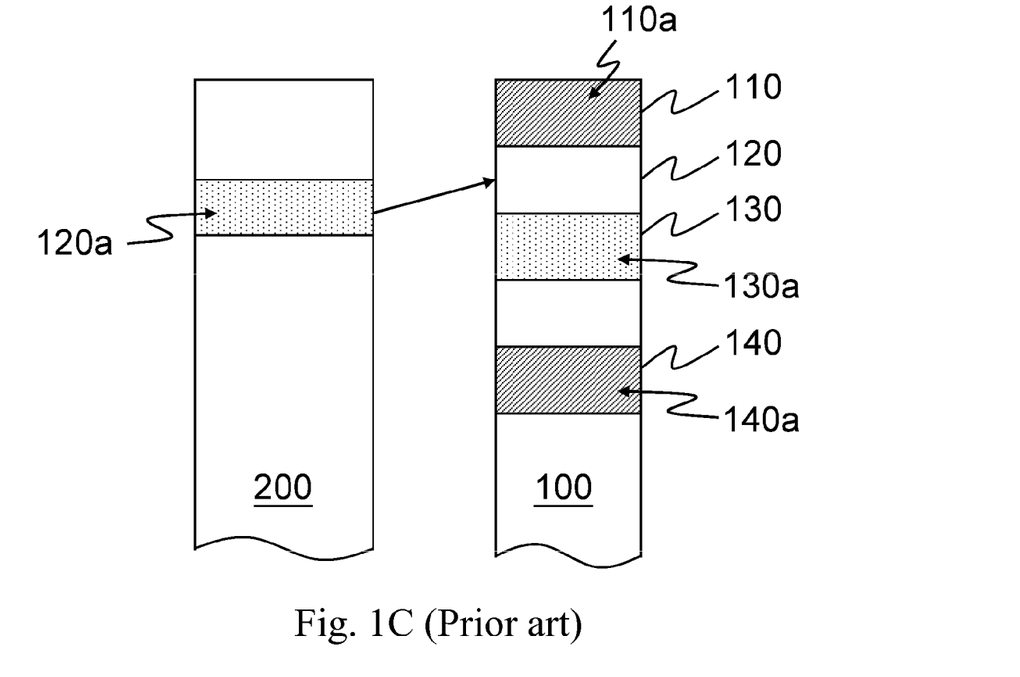
Figure 1D:
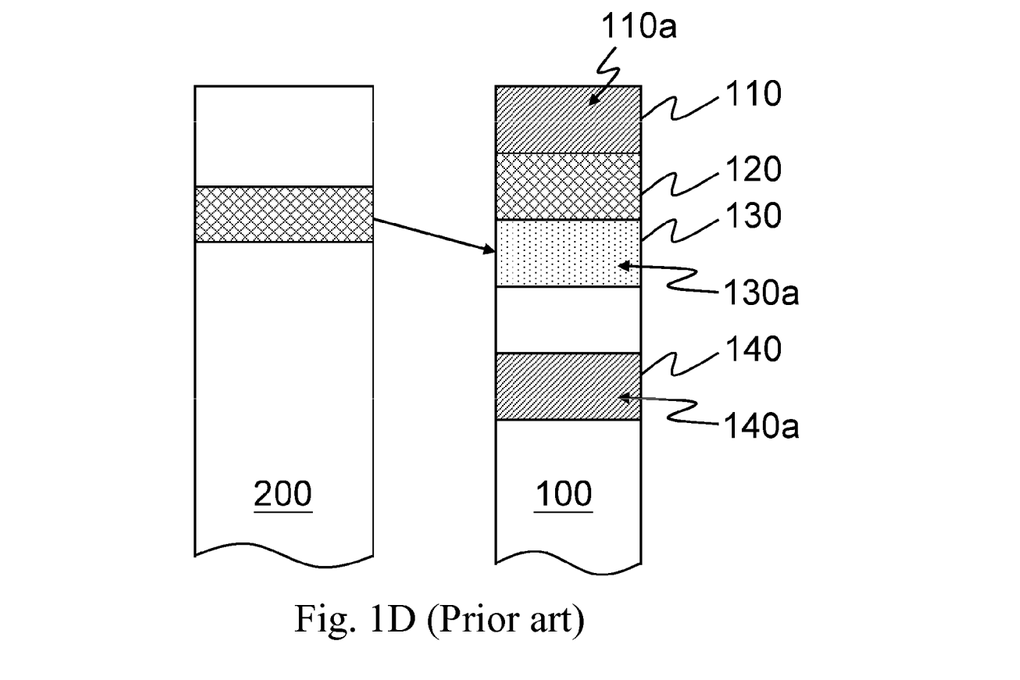

Referring to FIG. 1C, during an operation of the system, the currently executing configuration value (hereinafter referred to as the current configuration value 120a) is stored into the second block 120 of the non-volatile memory 100 by means of mapping the current configuration value 120a into the second block 120 of the non-volatile memory 100 to reserve the data being executed. Referring to FIG. 1D, the configuration value executed during shutdown is stored in the third block 130 of the non-volatile memory 100 as the prior configuration value 130a. Thus, in the next boot-up sequence, the same configuration values can be executed by loading the prior configuration value 130a.

Figure 1E:
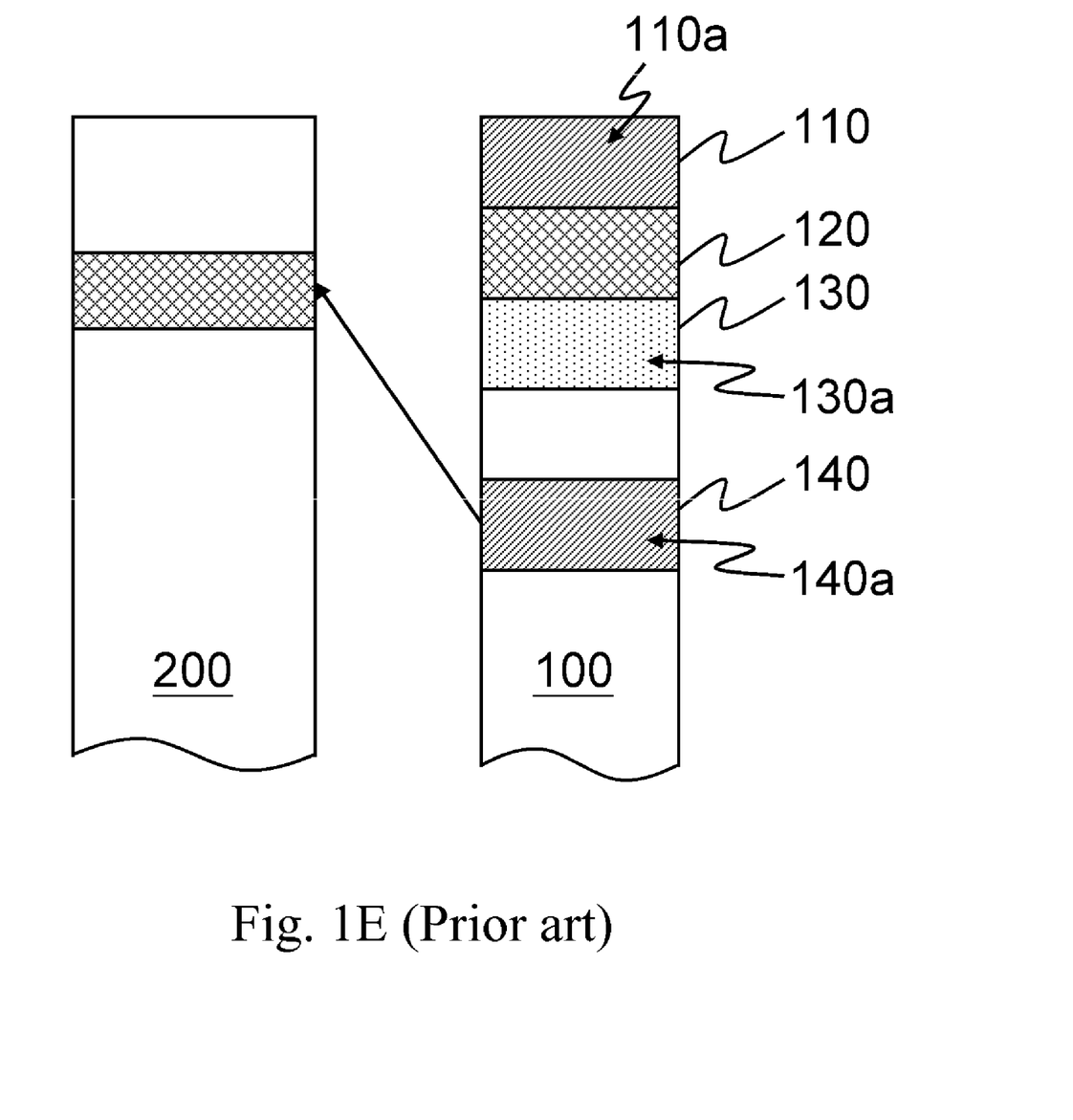

Referring to FIG. 1E, when a default-value recovery is executed, the system will read the default-recovery value 140a stored in the fourth block 140 of the non-volatile memory 100, and write it into the volatile memory 200.

The conventional system data management structure needs two spaces to store the default value for initialization and the default value for recovery. However, conservation of memory and storage space has become a very important issue.

SUMMARY

One of the objects of the present invention is to provide a data recovery method to save system space.

The present invention provides a data recovery method utilized in a system with storage of a default value and a prior configuration value, comprising the following steps: executing initialization of the system; loading the default value; detecting a status of a first flag to generate a first detection result; and determining whether a boot-up sequence in the system is complete according to the first detection result.

The present invention also provides a data recovery method for recovering at least one default value of a system, wherein the system comprises a first storage device and at least one second storage device, and a first block of the second storage device is stored with the default value, the method comprising: storing a prior configuration value in a second block of the second storage device, in which the prior configuration value is a configuration value executed by the system; loading the default value stored in the first block of the second storage device into an executing block of the first storage device; detecting a first flag in at least one specific block of one of the first storage device and the second storage device; and when the first flag is not detected, loading the prior configuration value stored in the second block of the second storage device into the executing block of the first storage device to overwrite the corresponding default value in the executing block of the first storage device.

The present invention also provides a data recovery method utilized in a system with storage of a default value and a prior configuration value, comprising: executing a system recovery process; re-booting the system; loading the default value; detecting the status of a first flag to generate a first detection result; and determining whether a boot-up sequence is complete according to the first detection result.

The features and practice of the present invention will be further described in reference to the embodiments and the attached drawings

DETAILED DESCRIPTION OF EMBODIMENTS

The present invention is described in details by the following embodiments with reference to the figures appended hereto. The symbols referred in the description are referred to the symbols in the figures.

Figure 2:
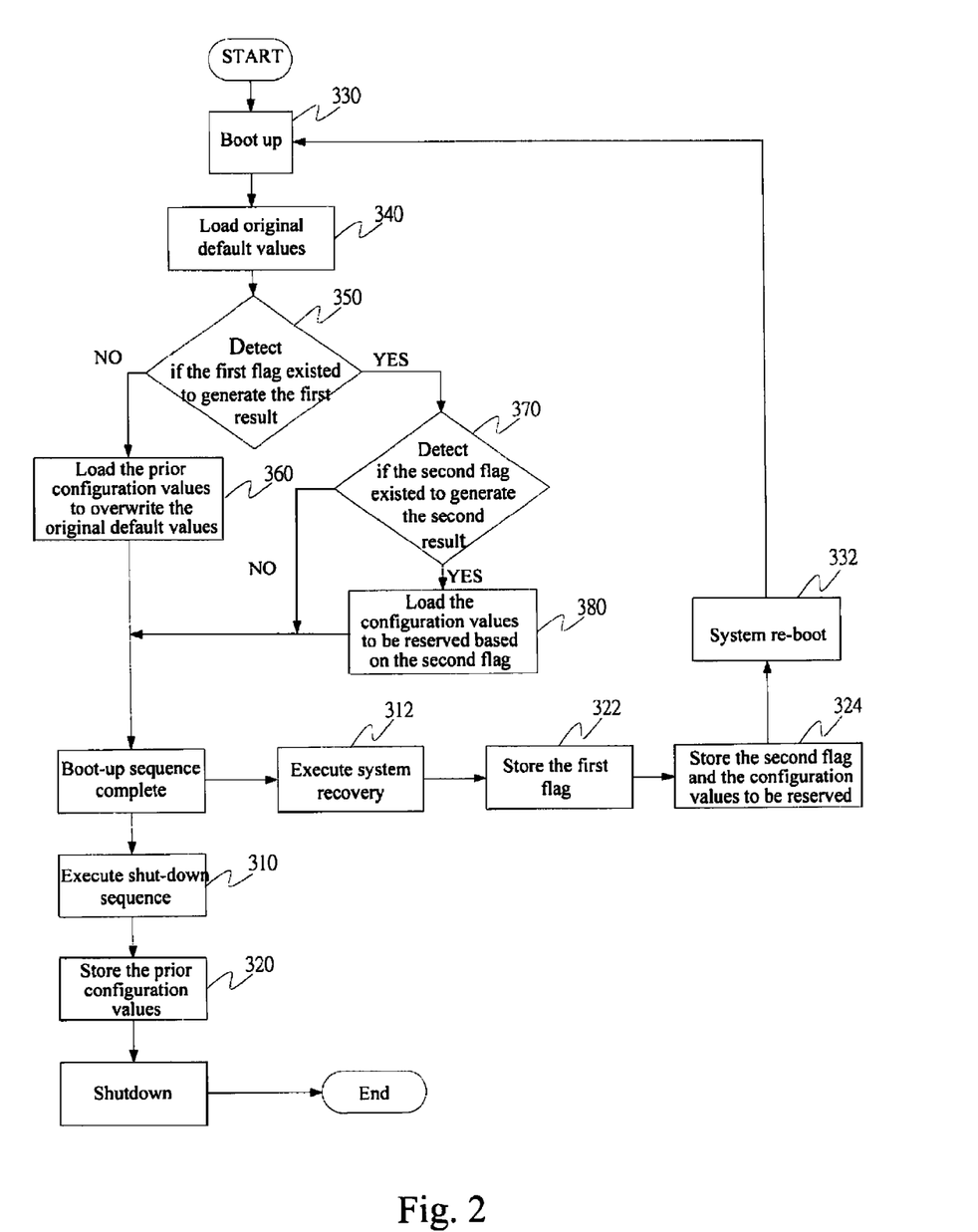
FIG. 2 is a flow chart of a data recovery method according to an embodiment of the present invention.

FIG. 2 is a flow chart of a data recovery method according to an embodiment of the present invention. FIG. 3A~3D are schematic views of the system management structure according to an embodiment of the present invention.

The data recovery method is used to recover at least one default value of a system. The system comprises a first storage device 400 and a second storage device 500. Herein, although only one first storage device 400 and one second storage device 500 are shown in the figures, more than one first storage devices and/or more than one second storage device 500 can be provided in the system in implementations.

A set of default values 510 and a set of prior configuration values 530 are stored respectively in a first block and a second block in the second storage device 500. Herein, the default values 510 may be various configuration values for the software/hardware. The prior configuration values 530 may be various configuration values for the software/hardware of the system before a previous shutdown, or may be various configuration values for the software/hardware of the system before a default recovery. In an embodiment, a program for a boot-up sequence includes the default values 510.

Figure 3A:
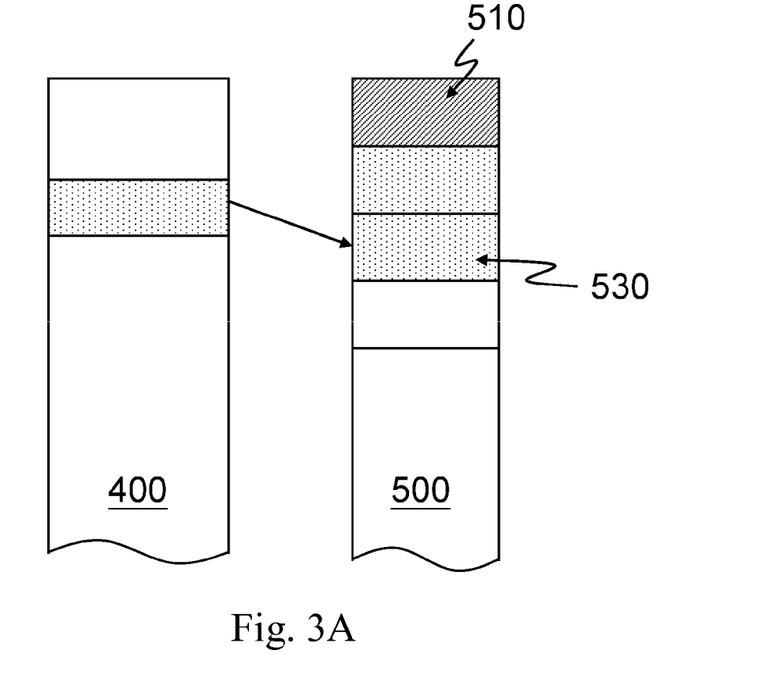
FIG. 3A~3E are the schematic views of an embodiment corresponding to the system data management structure in the data recovery method of the present invention; and, FIG. 3F~3H are the schematic views of another embodiment corresponding to the system data management structure in the data recovery method of the present invention.
Figure 3B:
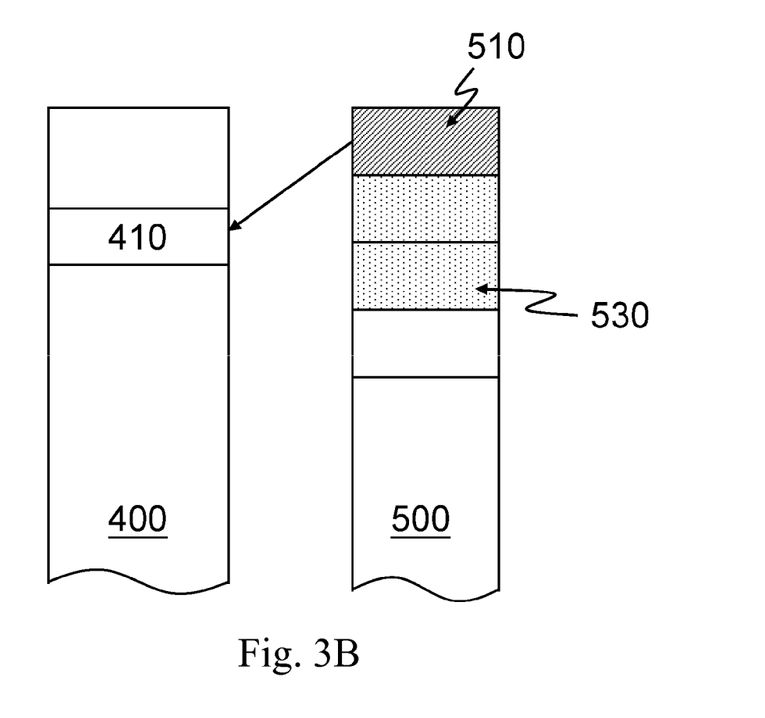
Figure 3C:
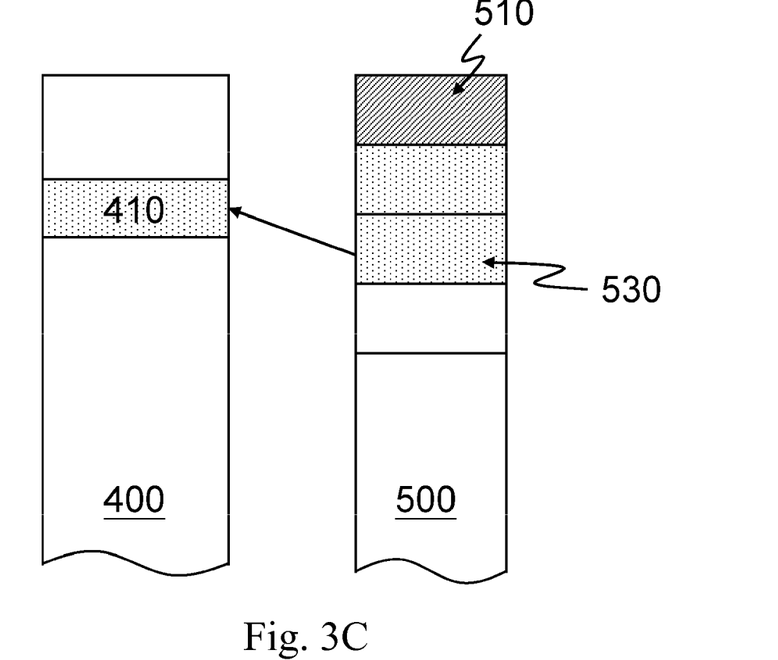

Referring to FIG. 2, in a shutdown sequence (step 310), the configuration values currently executed (hereinafter referred to as the prior configuration values 530) is stored in the second block of the second storage device 500 (step 320), as shown in FIG. 3A. Thereafter, in a boot-up sequence (step 330), initialization of the system will be executed, and the default values 510 in the first block of the second storage device 500 will be loaded into the executing block of the first storage device 400 (step 340), as shown in FIG. 3B. After the initialization is complete, the status of a first flag is detected to generate a first detection result, where the first flag locates in a specific block of the first storage device 400 or in a specific block of the second storage device 500. And, whether a boot-up sequence in the system is complete can be determined according to the first detection result (step 350). When the first flag is detected, the prior configuration values 530 stored in the second block of the second storage device 500 will not be loaded into the executing block of the first storage device 400. Therefore, the default values 410 will be executed in the executing block of the first storage device 400 and the boot-up sequence will be complete. When the first flag is not detected, the prior configuration values 530 stored in the second block of the second storage device 500 will be loaded into the executing block of the first storage device 400 to overwrite the corresponding default values 410 (step 360), as shown in FIG. 3C. Please note that the first flag be various determinations. In another embodiment, according to the content of the first flag, whether the boot-up is complete or whether it is necessary to load the prior configuration values 530 can also be determined. For example, if the value of the first flag is 0, the prior configuration values 530 stored in the second block of the second storage device 500 will not be loaded into the executing block of the first storage device. Therefore, the default values 410 will be executed in the executing block of the first storage device 400 and the boot-up sequence will be complete. If the value of the first flag is 1, the prior configuration values 530 in the second block of the second storage device 500 will be loaded into the executing block of the first storage device 400 so as to overwrite the corresponding default values 410.

Figure 3D:
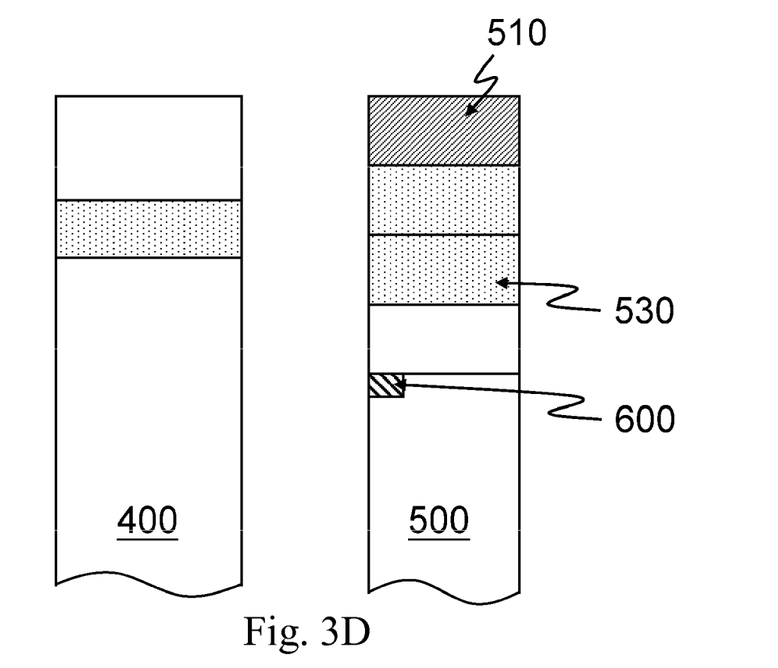
Figure 3E:
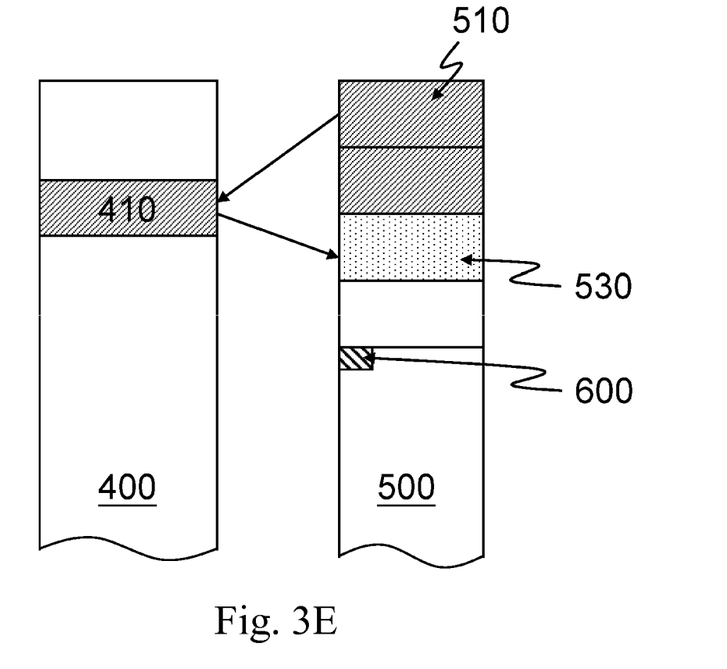

When a system recovery, namely, a default recovery, is selected (step 312), the configuration values currently executed (hereinafter referred to as the prior configuration values 530) will be stored in the second block of the second storage device 500, and the first flag 600 will be stored in a specific block of the second storage device 500 (step 322), as shown in FIG. 3D. Please note that, in another embodiment, the first flag 600 can also be stored in a specific block of the first storage device 400, wherein the first flag 600 includes a mark indicating that the default recovery is executed. Then, the system initialization can be proceeded by re-booting the system (step 332) or by directly performing the default recovery, such that the default values 510 stored in the first block of the second storage device 500 will be loaded into the executing block of the first storage device 400 (step 340), as shown in FIG. 3E. Next, the status of the first flag 600 in the specific block of the first storage device 400 or in the specific block of the second storage device 500 is detected to generate a first detection result (step 350). When the first flag 600 is detected, the prior configuration values 530 stored in the second block of the second storage device 500 will not be loaded into the executing block of the first storage device 400, and the default recovery is thus complete.

Figure 3F:
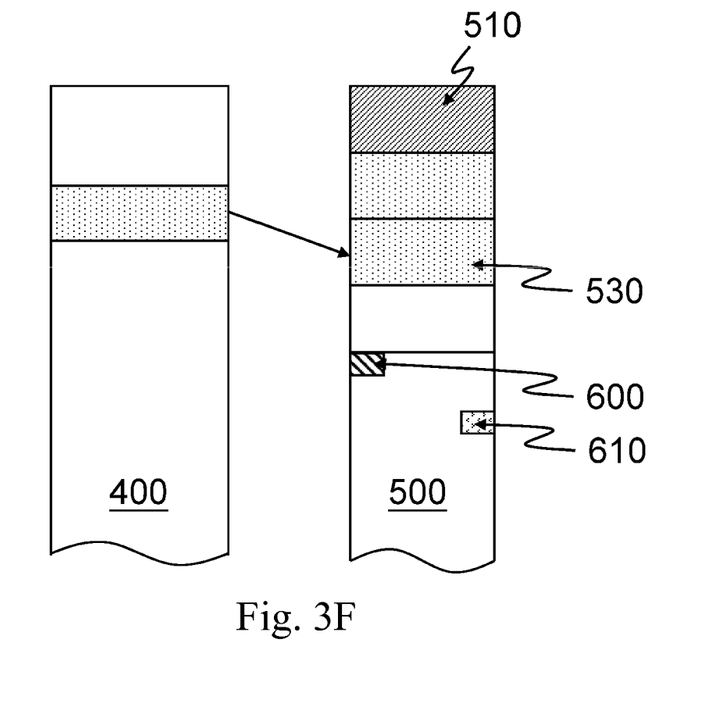

Further, when only part of the configuration values are to be replaced with the default values, partial recovery of the default values of the system will be executed (step 312). The prior configuration values 530 in the second block of the second storage device 500 and the first flag 600 in the specific block of the first storage device 400 or the second storage device 500 (step 322) will be stored. And, a second flag 610 in the specific block of the first storage device 400 or the second storage device 500 (step 324) will also be stored, as shown in FIG. 3F.

In other words, the second flag 610 and the first flag 600 may be stored in the same specific block or different specific blocks of the same storage device, or simply stored in different storage devices.

In the above-mentioned embodiment, the second flag 610 includes a mark corresponding to a selected prior configuration values selected not to be recovered.

Figure 3G:
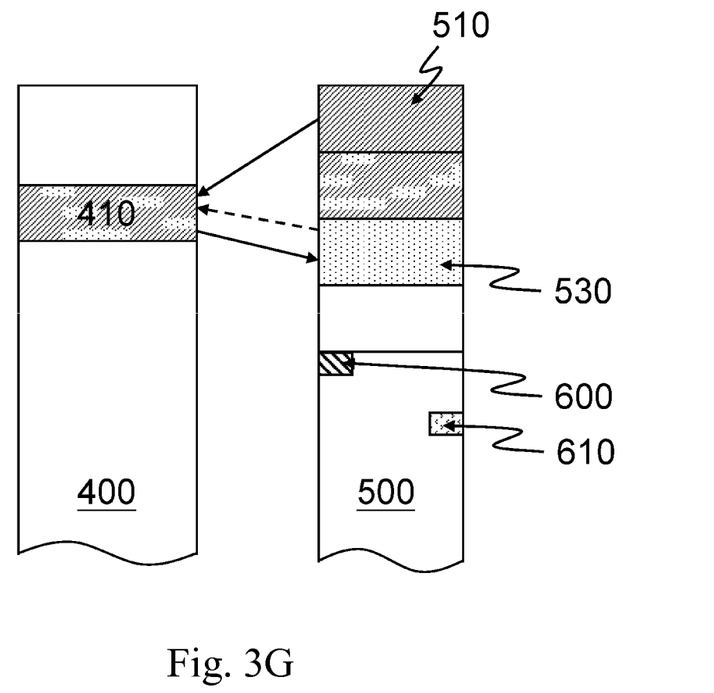

Similarly, the system initialization can be proceeded by re-booting the system or by directly performing the default recovery, (step 332) such that to load the default values 510 stored in the first block of the second storage device 500 into the executing block of the first storage device (step 340). Next, the status of the first flag 600 in the specific block of the first storage device 400 or in the specific block of the second storage device 500 is detected to generate a first detection result (step 350) and detection of the second flag 610 may be proceeded according to the first detection result. For example, when the first flag 600 is detected, the system will continue detecting the status of the second flag 610 in the specific block of the first storage device 400 or in the specific block of the second storage device 500 to generate a second detection result, and the subsequent process is determined according to the second detection result. For example, the system detects whether the specific block of the first storage device 400 or the specific block of the second storage device 500 is stored with the second flag 610 (step 370), and when the second flag 610 is detected, the prior configuration values selected not to be recovered among the prior configuration values stored in the second block of the second storage device 500 will be accessed and loaded into the executing block of the first storage device 400 to overwrite the corresponding default values 510 (step 380), as shown in FIG. 3G. Thus, partial recovery of default values is complete. When the second flag 610 is not detected, the executing block of the first storage device 400 will still execute the default values 410, and the boot-up sequence will be complete.

Figure 3H:
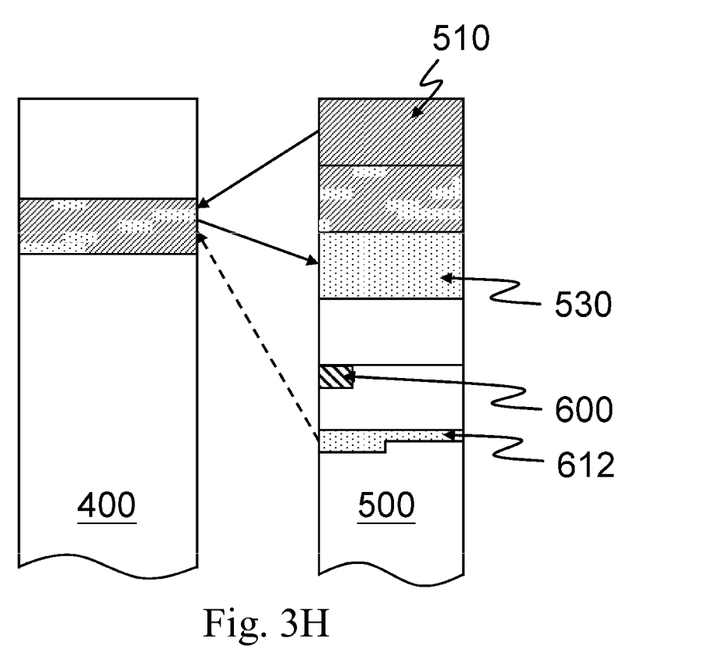

In another embodiment, when only part of the configuration values are selected to be replaced with the default values, the prior configuration values selected not to be recovered 612, like the second flag, can be directly stored in the specific block of the first storage device 400 or the second storage device 500. Thus, after the first flag 600 is detected, the specific block for storing the prior configuration values selected not to be recovered 612, is detected to confirm whether there are any prior configuration values selected not to be recovered 612. When the prior configuration values selected not to be recovered 612 is detected in the specific block, the prior configuration values selected not to be recovered 612 are directly accessed and the accessed the prior configuration values selected not to be recovered 612 are loaded into the executing block of the first storage device 400 to overwrite the corresponding default values 510, as shown in FIG. 3H. Thus, the partial recovery of the default values is complete.

In the present invention, the first storage device and the second storage device may include volatile memory and/or non-volatile memory, such as DDR (double data rate) memory, register and flash memory, but these devices are exemplary and the present invention is not limited thereto.

Therefore, by using the system of the present invention, repetitive saving of a lot of identical data can be avoided, and system space conserved.

Although the technical contents of the present invention have been disclosed in the embodiments as stated above, these embodiments are not intended to limit the scope of the present invention. Those proficient in the relevant fields can make a few changes and modifications without departing from the spirit of the present invention, and these changes and modifications should be all included in the scope of the present invention. Therefore, the protection scope of the present invention will be defined by the attached claims.

What is claimed is:

1. A data recovery method utilized in a system with storage of a default value and a prior configuration value, comprising the following steps:
   executing initialization of the system;
   loading the default value;
   detecting a status of a first flag to generate a first detection result;
   determining whether a boot-up sequence in the system is complete according to the first detection result;
   detecting a second flag to generate a second detection result; and
   determining whether the prior configuration value is loaded to overwrite the default value according to the second detection result;
   wherein the second flag comprises a mark for a selected prior configuration value not to be recovered.

2. The data recovery method according to claim 1, further comprising:
   loading the prior configuration value to overwrite the loaded default value when the first flag is not detected.

3. The data recovery method according to claim 1, further comprising:
   the boot-up sequence being complete when the first flag is detected.

4. The data recovery method according to claim 1, further comprising:
   determining whether the boot-up sequence is complete according to a content of the first flag.

5. The data recovery method according to claim 1, further comprising:
   executing a default recovery with the default value; and, storing the first flag.

6. The data recovery method according to claim 1, further comprising:
   selecting the prior configuration value;
   generating the second flag corresponding to the selected prior configuration value; and,
   storing the second flag.

7. The data recovery method according to claim 1, further comprising:
   detecting the selected prior configuration value not to be recovered; and,
   when the selected prior configuration value not to be recovered is detected, loading the selected prior configuration value not to be recovered to overwrite the loaded default value.

8. The data recovery method according to claim 7, further comprising:
   selecting the selected prior configuration values not to be recovered; and, storing the selected prior configuration values not to be recovered.

9. A data recovery method for recovering at least one default value of a system, wherein the system comprises a first storage device and at least one second storage device, and a first block of the second storage device is stored with the default value, the method comprising:
   storing a prior configuration value in a second block of the second storage device, in which the prior configuration value is a configuration value executed by the system;
   loading the default value stored in the first block of the second storage device into an executing block of the first storage device;
   detecting a first flag in at least one specific block of one of the first storage device and the second storage device;
   when the first flag is not detected, loading the prior configuration value stored in the second block of the second storage device into the executing block of the first storage device to overwrite the corresponding default value in the executing block of the first storage device;
   detecting a second flag to generate a second detection result; and
   determining whether the prior configuration value is loaded to overwrite the default value according to the second detection result;
   wherein the second flag comprises a mark for a selected prior configuration value not to be recovered.

10. The data recovery method according to claim 9, further comprising:
    executing a recovery of the default value of the system; and,
    storing the first flag in at least one specific block of one of the first storage device and the second storage device.

11. The data recovery method according to claim 9, further comprising:
    detecting a second flag in at least one specific block of one of the first storage device and the second storage device; and,
    loading the prior configuration value in the second block of the second storage device into the executing block of the first storage device according to the second flag to overwrite the corresponding default value in the executing block of the first storage device.

12. The data recovery method according to claim 11, further comprising:
    selecting a selected prior configuration value not to be recovered;
    generating a second flag corresponding to the selected prior configuration value not to be recovered; and,
    storing the second flag in at least one specific block of one of the first storage device and the second storage device.

13. The data recovery method according to claim 9, further comprising:
    detecting a selected prior configuration value not to be recovered in at least one specific block of one of the first storage device and the second storage device; and,
    when the selected prior configuration values not to be recovered are detected, loading the selected prior configuration value not to be recovered into the executing block of the first storage device to overwrite the corresponding default value in the executing block of the first storage device.

14. The data recovery method according to claim 13, further comprising:
    selecting the selected prior configuration value not to be recovered; and,
    storing the selected prior configuration value not to be recovered into at least one specific block of one of the first storage device and the second storage device.

15. A data recovery method utilized in a system with storage of a default value and a prior configuration value, comprising:

executing a system recovery process;
re-booting the system; loading the default value;
detecting the status of a first flag to generate a first detection result;
determining whether a boot-up sequence is complete according to the first detection result;
detecting a selected prior configuration value not to be recovered;
loading the selected prior configuration value not to be recovered to overwrite the loaded default value when the selected prior configuration value not to be recovered is detected;
detecting a second flag to generate a second detection result; and
determining whether the prior configuration value is loaded to overwrite the default value according to the second detection result;
wherein the second flag comprises a mark for a selected prior configuration value not to be recovered.

16. The data recovery method according to claim 15, further comprising:
loading the prior configuration value to overwrite the loaded default value when the first flag is not detected.

17. The data recovery method according to claim 15, further comprising:
the boot-up sequence being complete when the first flag is detected.

18. The data recovery method according to claim 15, further comprising:
executing a default recovery with the default value; and, storing the first flag.

19. The data recovery method according to claim 15, further comprising:
selecting the selected prior configuration value not to be recovered; and,
storing the selected prior configuration value not to be recovered.

* * * * *